United States Patent [19]
Smith

[11] Patent Number: 5,903,005
[45] Date of Patent: May 11, 1999

[54] ASPHERICAL ELEMENTS FOR INFRARED IMAGING SYSTEM

[75] Inventor: Richard R. Smith, Los Angeles, Calif.

[73] Assignee: Hughes Electronics, Los Angeles, Calif.

[21] Appl. No.: 08/604,041

[22] Filed: Feb. 20, 1996

Related U.S. Application Data

[60] Provisional application No. 60/004,525, Sep. 29, 1995.
[51] Int. Cl.⁶ ................................................... G02B 26/10
[52] U.S. Cl. ...................................... 250/334; 250/339.14
[58] Field of Search ..................................... 250/334, 330, 250/339.14

[56] References Cited

U.S. PATENT DOCUMENTS

| | | |
|---|---|---|
| 4,912,321 | 3/1990 | Cooper . |
| 4,989,928 | 2/1991 | Fantozzi et al. . |
| 5,257,133 | 10/1993 | Chen ........................................ 359/565 |

FOREIGN PATENT DOCUMENTS

| | | |
|---|---|---|
| 0-532627 | 3/1993 | European Pat. Off. . |
| WO 9119377 | 12/1991 | WIPO . |

*Primary Examiner*—David P. Porta
*Assistant Examiner*—Richard Hanig
*Attorney, Agent, or Firm*—Gordon R. Lindeen, II; Michael W. Sales; Wanda K. Denson-Low

[57] ABSTRACT

In a thermal imaging unit (12) including optics (16,18) for detecting a target scene (14), a detector array (26) responsive to target scene energy and a scanner (23) for scanning target scene energy from the target (14) onto the detector array (26), an imager lens assembly (120) for focusing the target scene energy onto the detector array. The imager lens assembly includes entrance means (126) for passing the target scene energy. The imager also includes both a first aspherical lens (122) for providing an intermediate focus of the target scene energy and a second aspherical lens (124) for receiving the intermediately focused scene energy and focusing the intermediately focused scene energy onto the detector array.

19 Claims, 8 Drawing Sheets

ASPHERICAL ELEMENTS FOR INFRARED IMAGING SYSTEM

This application is based upon Provisional Application No. 60/004,525 filed Sep. 29, 1995, the priority of which is hereby claimed.

BACKGROUND OF THE INVENTION

1. Technical Field

The present invention relates generally to thermal imaging systems, and in particular to an aspherical lens assembly in an infrared imaging system imager that minimizes the number of components and space required to implement the imager.

2. Discussion

Scanning thermal imaging systems are used in a variety of applications, including surveillance systems and target detection/recognition systems. Such systems typically incorporate a telescopic lens assembly coupled to a scanner. The scanner scans energy from a scene through an imager lens assembly onto a detector array having a plurality of photoelectrically responsive detector elements perpendicular to the scan direction. Each of these detector elements provides an electric signal proportional to the flux of infrared light on the particular detector element. Electric signals generated from the detector elements are subsequently processed by system sensor electronics to create an image that is displayed on a system output device. To improve sensitivity, some of these systems incorporate detectors parallel to the scan direction. The output of these detectors are delayed in time from each other such that, ideally, the scanned image is output simultaneously on all of the parallel detectors. The delayed outputs are then summed (integrated). This process is referred to as time delay and integrate (TDI).

In the above-mentioned thermal imaging systems, the imager must focus the thermal energy from the detected scene sharply onto the detector array to ensure clarity of the video signal output on the system output device. In conventional imager systems, multiple lenses were implemented to effect the focus of the detected scene energy onto the array. While such multi-lens imagers provide adequate focusing of the detected scene energy onto the array, there are advantages to further improvement in the art for the following reasons.

First, each element in an imager is required to be manufactured to certain tight tolerances and then incorporated into the imager to other tight tolerances on such variables as centration and tilt. The elimination of elements then greatly reduces the complexity of fabrication of the imager. Additionally, system weight is also reduced.

Second, multiple lens imagers require a great deal of system volume to provide for the lens elements and mechanisms which hold them in place. As present-day thermal imaging system parameters continue to decrease in size, it would be desirable to minimize image lens assembly volume requirements.

Third, imager expense is increased in proportion to the number of lenses implemented in the system. The above-mentioned lens materials have a high associated cost. In addition, lenses formed from commonly-used brittle materials such as AmTir1 are highly susceptible to breakage and must be replaced when broken, thereby adding further cost to the system.

What is needed then is a thermal imaging system imager for focusing detected scene energy onto a system detector array that is implemented with a minimum number of elements, thereby reducing system cost and complexity while at the same time maintaining necessary optimum performance characteristics.

SUMMARY OF THE INVENTION

In accordance with the teachings of the present invention, an imager is provided for use in a thermal imaging system for focusing energy from a scene onto a detector array. While conventional imagers are typically implemented with as many as five spherical lenses, the imager of the present invention is implemented with two aspherical lenses, thereby minimizing system cost and complexity.

In particular, the present invention provides an imager for focusing target scene energy onto a detector array in a thermal imaging unit. The imager includes entrance means for passing the target scene energy. The imager also includes both a first aspherical lens for providing an intermediate focus of the target scene energy and a second aspherical lens for receiving the intermediately focused scene energy and focusing the intermediately focused scene energy onto the detector array.

BRIEF DESCRIPTION OF THE DRAWINGS

Other objects and advantages of the invention will become apparent upon reading the following detailed description and upon reference to the drawings, in which.

DETAILED DESCRIPTION OF THE PREFERRED EMBODIMENT

The following description of the preferred embodiments is merely exemplary in nature and is in no way intended to limit the invention or its application or uses.

Figure 1:
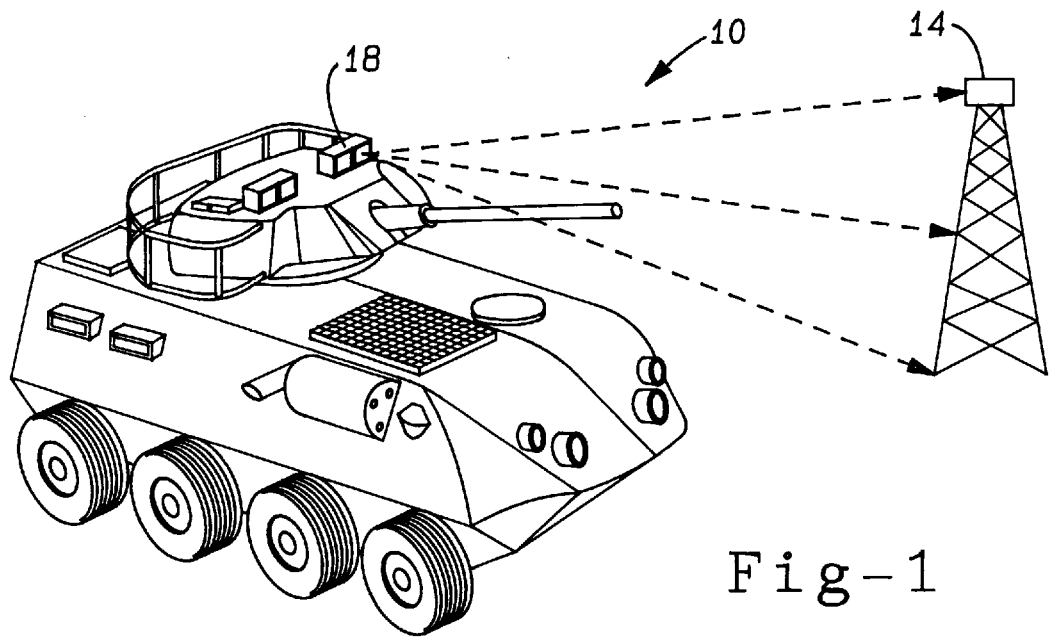
FIG. 1 illustrates an LAV-25 light armored vehicle in which the present invention may be implemented.
Figure 2:
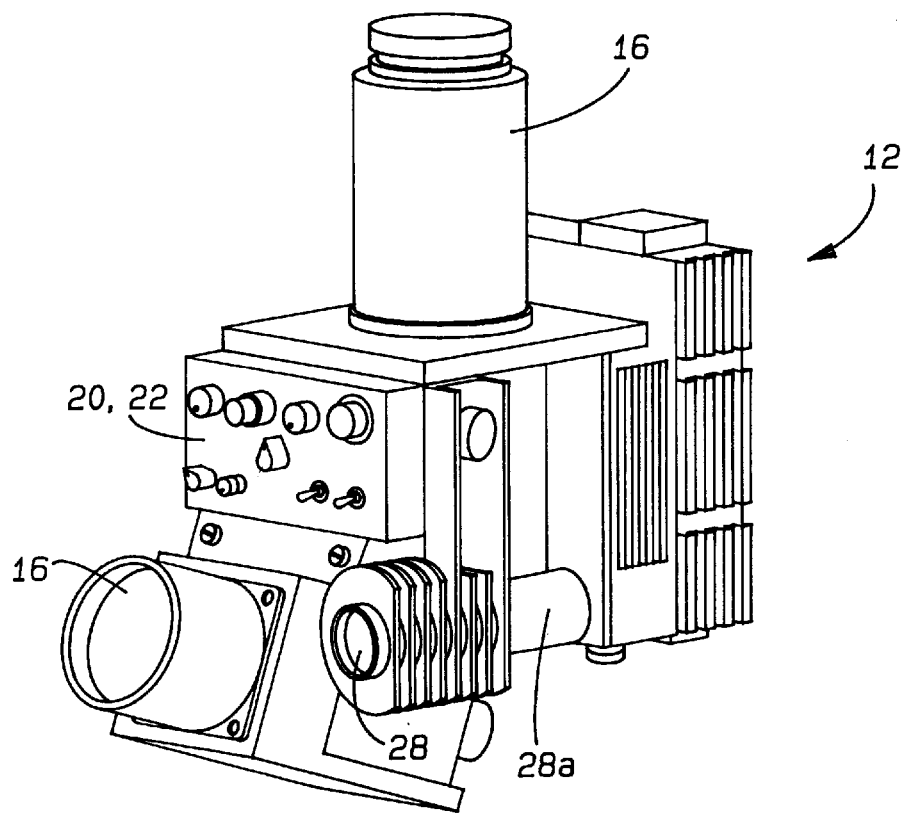
FIG. 2 is a perspective view of a thermal imaging system in which the preferred embodiment of the present invention is implemented.

Referring to the drawings, FIG. 1 shows an LAV-25 light armored vehicle 10 in which the preferred embodiment of the present invention is implemented. As shown in FIGS. 1 and 2, the present invention is implemented as part of a thermal imaging unit 12, which processes energy reflected from a detected target scene 14 back through a system telescope assembly 16 coupled to an externally mounted head mirror 18.

Preferably, the thermal imaging unit 12 is a Hughes Infrared Equipment (HIRE) thermal imaging sensor unit. The HIRE unit is a high performance light weight modular fire control sight and thermal imaging system that is capable of providing superior vision capability through total darkness, smoke, dust, and other types of adverse conditions. The HIRE system may be implemented in a wide variety of environments, including in a variety of armored vehicles, such as the LAV-25, Piranha, Desert Warrior, and LAV-105. The thermal imaging unit 10 provides stand alone thermal imaging capability, but can also be configured for use with TOW missile fire control systems. The unit incorporates several commercially available major components, thereby reducing logistics requirements through commonality of such things as repair facilities, support equipment, training programs and spare parts. The EFL compensator of the present invention enables the thermal imaging sensor unit to provide a significant improvement in imaging unit image quality and range performance over conventional thermal imaging systems as will now be described.

Referring to FIGS. 1–5, the telescope assembly 16, through which target searching and sighting functions are achieved, is implemented in a protected environment within the vehicle 10. Preferably, the telescope assembly 16 may be selectively switched to either a narrow field of view or a wide field of view as desired through switches on the gunner and commander control panels 20, 22. The head mirrors 18 are implemented to relay a detected scene to the telescope assembly 16. Subsequent to target scene thermal energy signal being processed by the thermal imaging unit, as will be described below, the scene is viewed through a gunner display 19 operatively coupled to a display control panel 20 and a commander display 21 coupled to a commander display control panel 22.

Figure 3:
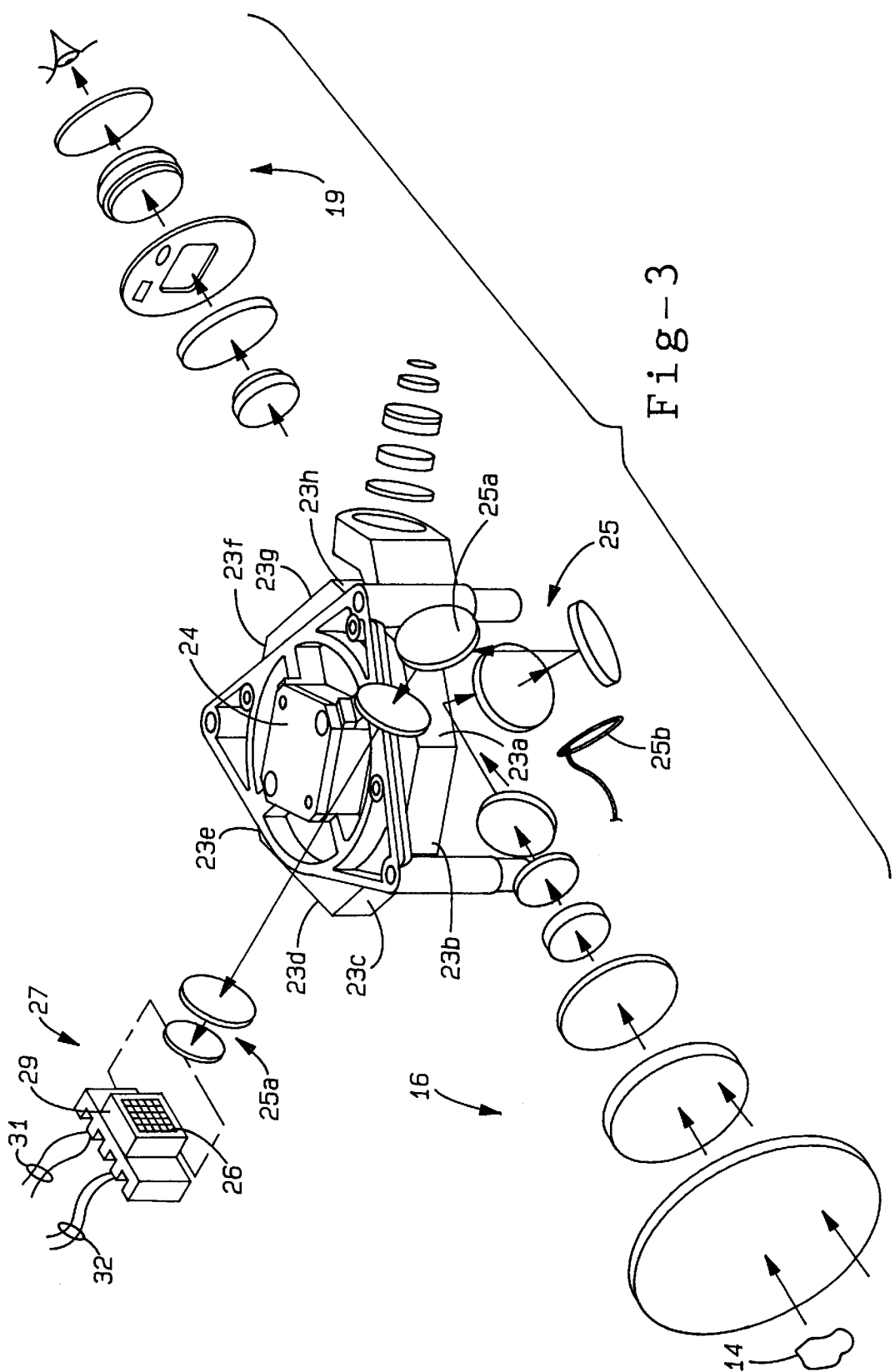
FIG. 3 is a partial exploded view of the thermal imaging system shown in FIG. 2.

As shown in FIG. 3, energy from the detected scene is transmitted through the thermal imaging unit 12 to a polygonal, mirrored scanner 23 rotated by a scanner motor 24. The scanner includes 8 facets 23a–23h, each of which is cut at an angle to effect displacement of the scanned scene energy on the detector array by a discrete amount. The cut and displacement effected by each facet is shown below: t,70

As the scanner rotates, the scanner mirrors reflect the scene energy at successively varying angles through an imager assembly shown generally at 25. The imager assembly includes imager lenses, such as lens 25a, which image the scene onto a detector array 26 housed within a detector assembly 27. The imager assembly 25 also includes an imager optics temperature sensor 25b for monitoring the temperature of the imager. The detector assembly 27 is housed within a dewar 28 and cooled by a cooler 28a to cryogenic temperatures. A cold shield 29 housed within the dewar 28 limits the thermal energy that can be seen by the detector such that the detector elements only detect scene energy input through the telescope assembly optics and not other peripheral forms of energy input into the system, such as energy from the warm sides of the housing. The cold shield thereby reduces input noise and thereby improves overall system image quality.

Figure 4:
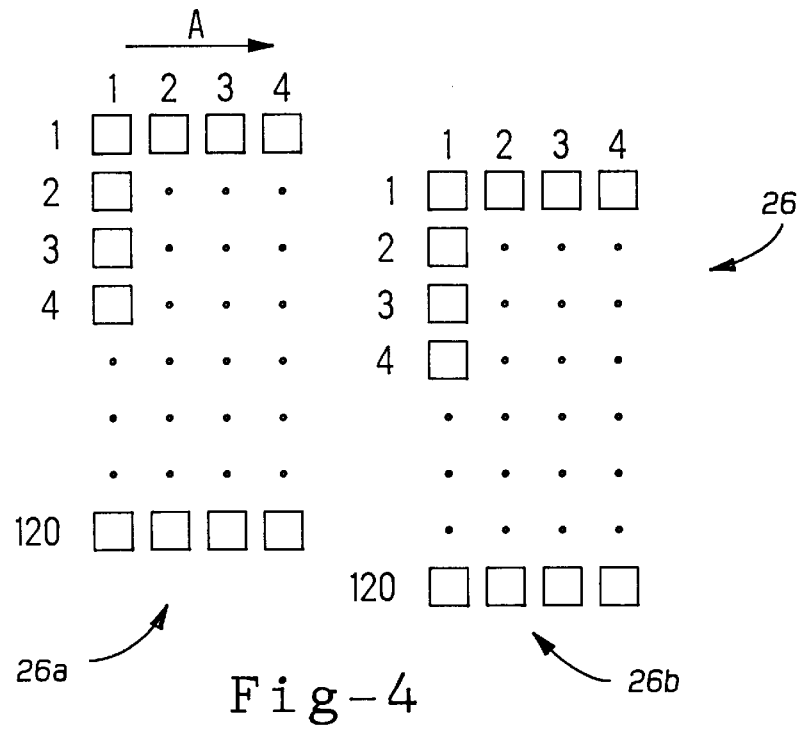
FIG. 4 illustrates the arrangement of the detector assembly elements shown partially in FIG. 3.

As shown partially in FIG. 3 and more fully in FIG. 4, the detector array 26 of the present invention consists of two staggered 120×4 subarrays 26a, 26b of detector elements, with each element being sensitive to light in the infrared spectrum and each having a detector element output. As the scanner scans the image of the scene across the detector in the direction indicated by the arrow A shown in FIG. 4. The output of each detector element is input to a readout integrated circuit (ROIC) 27a (FIG. 5) associated with the detector assembly which samples the output, provides the time delay and integration (TDI) of the four parallel detector elements in each detector element row, and multiplexes the 240 resulting TDI detector channels into 4 video output channels 31, 32, with output channels 31 carrying output signals from the first 120×4 detector subarray 26a, and output channels 32 carrying output signals from the second detector subarray 26b. The ROIC includes a TDI clock 27b that determines when the detector outputs are sampled at the TDI, a multiplexer 27c, and a higher speed detector clock 27d for the ROIC multiplexer, which preferably has a minimum 60:1 sample period.

In the preferred embodiment, the 4 multiplexed output channels of the detective assembly are further multiplexed into one channel by the signal processing electronics at the input high speed clock (HCLK) rate which preferably has a minimum 240:1 sample period and is associated with system electronics described below in reference to FIG. 6. An EFL compensator varies the sample rate of the DCLK 27d to control the sample rate of the TDI clock 27b.

Presently implemented detector arrays typically feature 60 to 120 detector elements, with each having an associated output wire. Thus, the detector array of the present invention exhibits higher resolution due to the additional detector elements. Further, the detector array of the present invention utilizes multiplexed detector array output lines, thereby minimizing detector element output wires and thus minimizing area required to implement the array and facilitating ease of assembly and repair.

Figure 5:
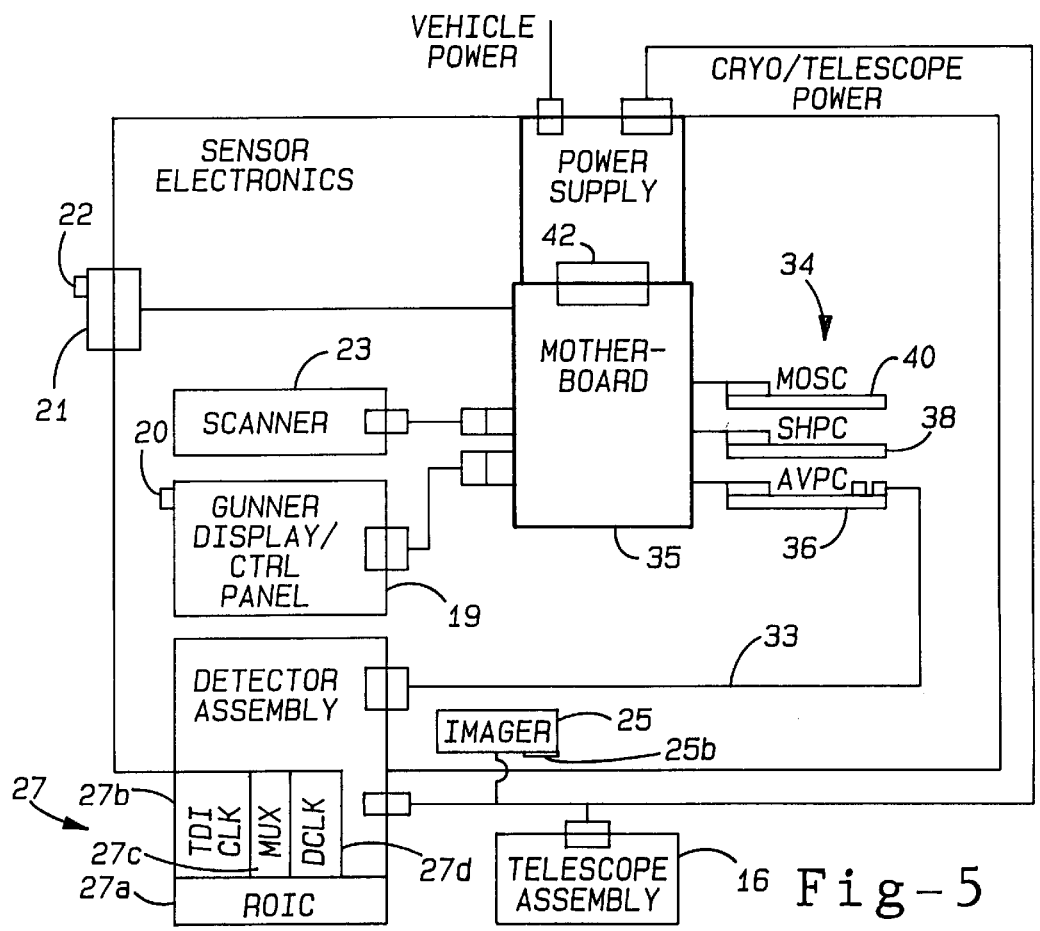
FIG. 5 is a block diagram of the thermal imaging system shown in FIG. 2.

Referring now to FIG. 5, operation of the imaging system components is controlled generally by the system electronics 34. The system electronics 34 are implemented on three cards coupled to a system mother board 35. The cards include an analog video processing card (AVPC) 36, a scene based histogram processor card (SHPC) 38 and a memory output symbology card (MOSC) 40. The associated functions of each of these cards will be discussed in greater detail below. Also coupled to the mother board 35 is a power supply card 42 that receives power input from the vehicle in which the system is implemented and outputs power to various system components at voltage levels required by the individual system components.

Figure 6:
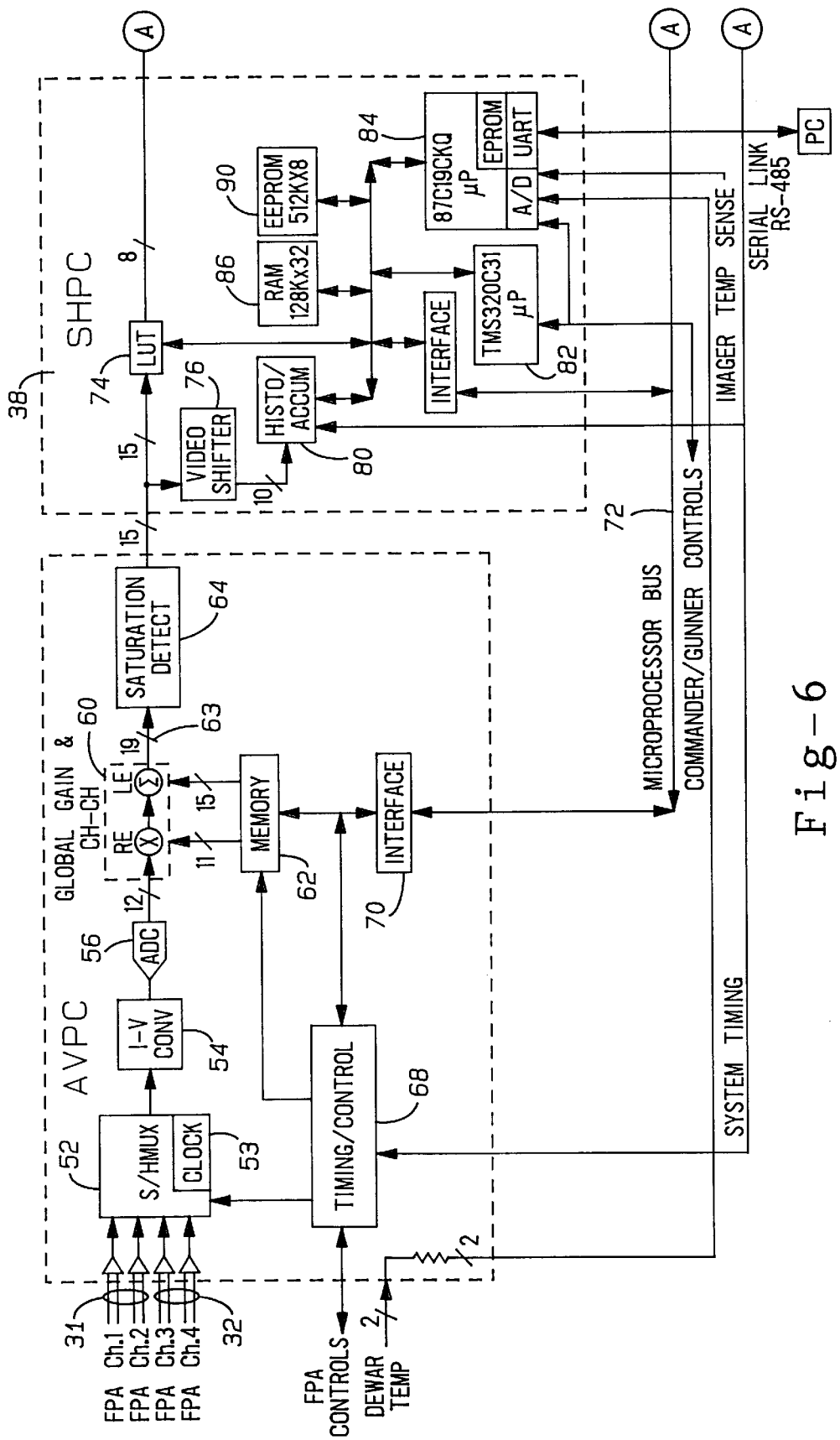
FIGS. 6–6A are block schematic diagrams of system electronics of the thermal imaging system of the present invention.
Figure 6A:
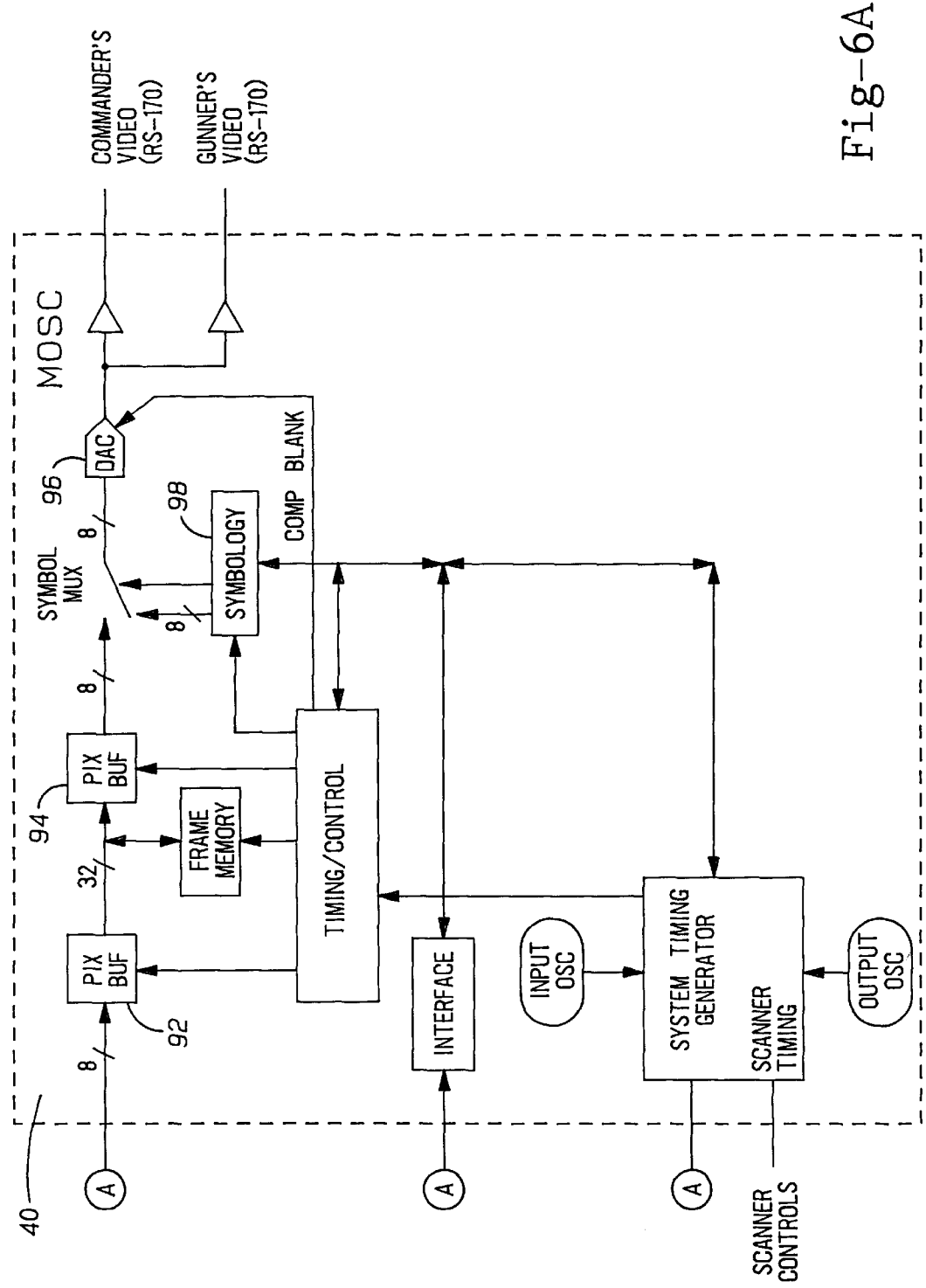

Referring now in detail to FIG. 6, an overall block diagram showing the components implemented on the three cards 36, 38 and 40 shown. Referring first to the AVPC card 36, channel outputs 31, 32 are input into an S/HMUX 52 having an associated high speed system multiplier clock (HCLK) 53. Preferably, all 960 detector elements (240 pixels) are clocked during the clock sample period. The S/HMUX 52 is preferably a HUGHES custom integrated circuit, Part No. 6364060PGA-DEV, designed to sample and further multiplex the multiplexed detector element outputs. These multiplexed signals are sampled at an adjustable sample rate. However, for further signal processing, the signals are converted to voltage signals through I–V converter 54. Once these signals are converted, the signals are digitized by an analog to digital converter 56.

After being converted into digital signals, the detector element output signals are input into a signal equalizer 60. The signal equalizer 60 adds an associated gain and level value, stored in a memory 62, for each one of the 240 detector pixel elements to correct any gain and level differences from each of the detector pixel signals so that the multiplexed digital signal output at 63 is uniform, thereby enhancing picture quality.

Still referring to the AVPC card 36, the digitized input signal (to the signal equalizer 60) is 12 bits. However, the signal equalizer, in correcting signal gain and level differences, subsequently increases the digital signal output to 19 significant bits. As the signal contains only 15 bits of usable data, saturation detector 64 sets all data above the 15 bit range to a saturation level of 1 and all data below the 15 bit range to 0. Therefore, only the useful data within the 15 bit range is output to the SHPC card 38. The AVPC card also includes a timing/control processing unit 68 implementing the clocks 53 and line timing for clocking multiplexed signals from the S/HMUX during a sample period. Preferably, the line timing HCLK has a clock sample rate of 240 TDI channels per sample period plus 16 clocks dead time. However, this rate may be varied by the present invention as necessary as will be described below. The AVPC card also includes an interface 70 that connects AVPC card components to a system microprocessor bus 72.

Turning now to the SHPC card 38, the signal output from the saturation detector 64 is input into a look-up table 74. Generally, the output dynamic range of the digitizing and signal equalizing process is greater than the maximum dynamic range of traditional image displays. Moreover, there are areas of the output dynamic range that have minimal or no information. Therefore, the output signal of the digitizing and signal equalizing process is input into a look-up table 74 to compress the information into display dynamic range. The look-up table provides a programmable method of mapping the larger input dynamic range into the smaller output dynamic range. The mapping can be varied continuously either based on manual input from a system operator or based on an automatic histogram-based method. Prior to the look-up table, the video is input to a histogram/accumulator 80. The histogram/accumulator 80 performs certain programmable functions, such as line summing, line grabbing, and histogramming of the digitized information. The look-up table 74 converts the 15 bit signal output from the saturation detector to an 8 bit output signal. The lookup table is preferably a 32k×8 Random Access Memory (RAM) well known in the art such as Integrated Device Technology Model No. IDT71256, and can be varied continuously either based on manual input from a system operator or based on an automatic gain algorithm. The 15 bit signal output from the saturation detector is also converted to a 10 byte signal through a video shifter 76.

Also located on the SHPC card 38 are microprocessors 82 and 84. As discussed above, many functions are under microprocessor control. The microprocessor 84 performs numerous control-related operations associated with the control panel(s), controls the TDI clock rate for EFL compensation and histogram/accumulator function, and calculates the level equalization value for each pixel, the global level control value, and the look-up table values. The microprocessor 82 performs more system-based processing related functions and is operatively associated with a RAM 86 and an EEPROM 90. Both the RAM 86 and the EEPROM 90 store the software based commands controlling the electronic effective focal length compensator according to the preferred embodiment of the present invention, the function of which will be described in greater detail below.

Referring now to the MOSC card 40, the 8 bit output signal from the look-up table 74 is input through pixel buffers 92, 94 and output to both the gunner display 19 and the commander display 21 after being scan-converted via a frame memory and converted back to an analog signal through the digital to analog converter 96. Symbology may also be switched in for any pixel in the image signal by symbology processor 98 before being output through the digital analog converter 96. Such symbology data may include status indications, sighting cross hairs and instructional text at the bottom of either the commander or the gunner display.

Prior to being output to the display, the digitized signal is scan converted. Generally, the scanner scans the scene horizontally; thus, the data is multiplexed along vertical columns. Standard video displays, however, require the data to be output along horizontal lines. Therefore, the digitized data must be converted from the vertical column input format to a horizontal line output format. Moreover, because of the separation between the detector subarrays, the digitized data from the subarrays are delayed in time from each other. This delay must be removed. The delay is dependent of the imager's effective focal length and, because the data is digitized, correct removal of the delays depends upon correct compensation for the image focal length changes. An EFL compensator implemented in the system electronics provides both of these functions.

Figure 7:
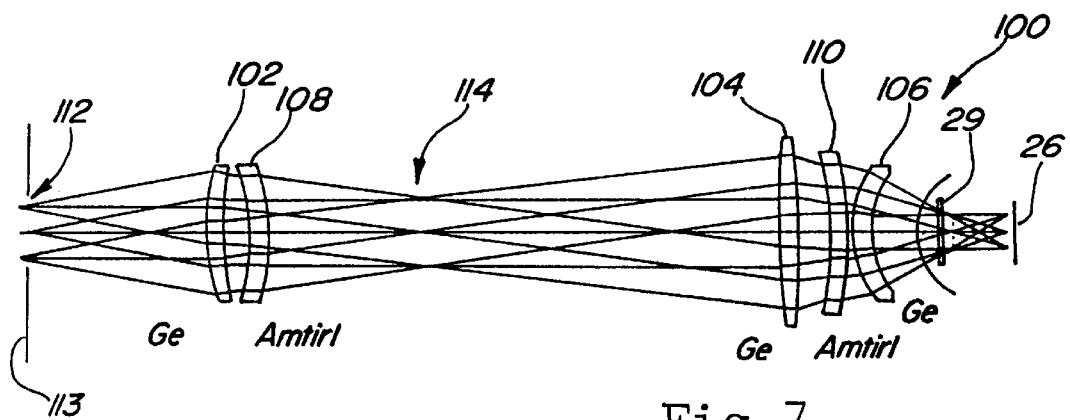
FIG. 7 is a top plan view of a prior art imager.

Referring to the drawings, FIG. 7 shows a prior art imager lens assembly generally at 100. This assembly is implemented using five spherical lenses: three germanium lenses 102, 104, 106 and two lenses 108, 110 composed of AmTir1 material, a brittle, hard coated material commonly used in the optics industry. As shown, detected energy from the target scene 14 is scanned by the scanner 23. This scanned energy is input into the imager through pupil 112 formed at the cold stop 113 to the lenses 102, 108. The imager achieves an intermediate focus of the energy as shown at 114. The target scene energy is then focused through lenses 104, 106, 110 onto the detector array 26 through the detector array cold shield 29. The AmTir1 lenses 108, 110 are implemented to provide color correction of the broader band energy input through the imager. The germanium lenses 102, 104, 106 are implemented as shown to deliver the detected scene energy in a highly focused form to the detector array, thereby ensuring a high quality video signal output from the array having minimal associated blur.

Figure 8:
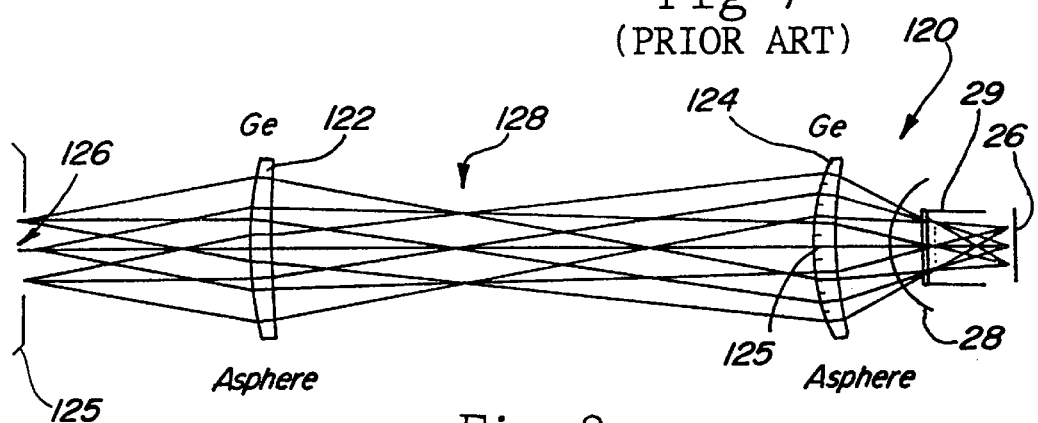
FIG. 8 is a top plan view of a first preferred embodiment of an imager according to the present invention.

Referring now to FIG. 8, a top plan view of an imager lens assembly according to a preferred embodiment of the present invention is shown generally at 120. The imager lens assembly 120 consists essentially of two aspherical germanium lenses 122, 124. Each of these lenses is preferably formed from single point diamond turned germanium and coated with an anti-reflective coating. In addition, the lenses are separated from one another preferably by a distance of about 3.617 inches when linearly aligned as shown. One or both of the lenses may also include a grating, such as is shown at 125 on lens 124, to correct chromatic aberrations. The lenses 122, 124 provide the same high quality thermal energy focusing features as the lenses implemented in the system 100. However, the lens assembly 120 reduces overall system cost by eliminating the two AmTir1 color correction spherical lenses 108, 110 which are expensive and brittle, and are thus difficult to manufacture and implement and are highly susceptible to breakage. Thus, by reducing the number of imager lenses, the lens assembly 120 reduces overall system cost.

In operation, an imager lens assembly pupil receives energy from the target scene 14, as it is scanned by the scanner 23, through a pupil 125 formed at a cold stop 126. The scanned energy is then input through the first aspherical lens 122, which achieves an intermediate focus of the detected scene energy at 128. Subsequently, the scene energy is further focused through aspherical lens 124 through cold stop 29 onto the detector array 26.

It should be understood at this point that the imager lens assembly 120 is implemented to image energy over a spectral bandwidth typically ranging from 7.5 to 10.5 microns. Thus, as opposed to prior art imager lens assemblies, which were typically implemented over a spectral bandwidth of 8 to 12 microns and thus required some form of color correction mechanism, the need for spherical lenses, such as the AmTir1 lenses 108, 110 shown in FIG. 7, is eliminated.

Figure 9:
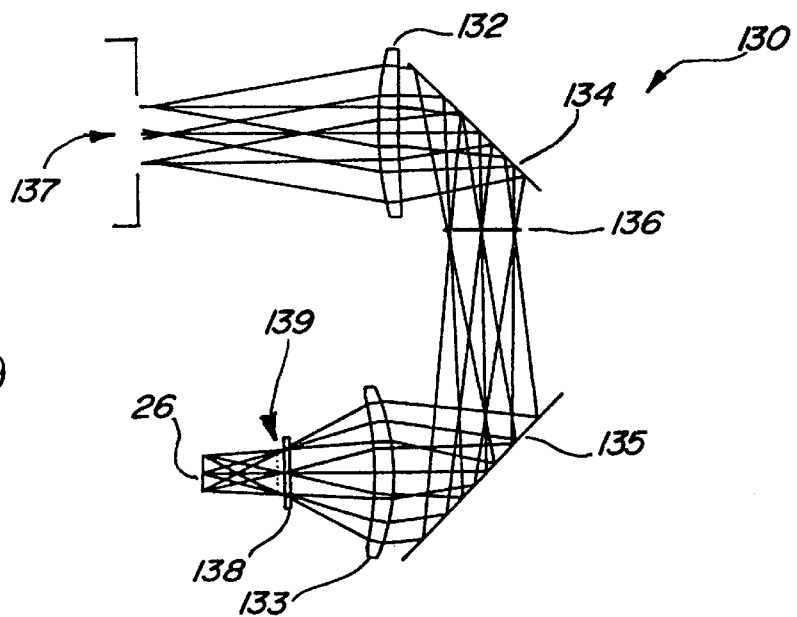
FIG. 9 is a top plan view of a second preferred embodiment of an imager according to the present invention.

Turning now to FIG. 9, a second preferred embodiment of the present invention is shown generally at 130. The lens assembly 130 includes two aspherical lens 132, 133 identical in structure and function to the aspherical lenses 122, 124 shown in FIG. 7. The lenses 132, 133 are implemented along with folding mirrors 134, 135 to focus energy from the detected scene 14 onto the detector array 12. In addition, a field stop 136 is positioned at the point of intermediate focus of the energy to eliminate narcissus effects caused by surface reflections and from the telescope lenses.

Thus, in operation, energy from the detected scene passes through a pupil 137 and through the first aspherical lens 132 and is reflected off of a first folding mirror 134 before achieving an intermediate focus at field stop 136. The energy subsequently passes through he field stop 136 and is reflected off of the second folding mirror 135 through the second aspherical lens 133.

After passing through the second aspherical lens 133, the energy passes through the dewar window 138 and the through the cold stop 139, which preferably is a F/1.77 stop, before being focused on the detector array 26.

Figure 10A:
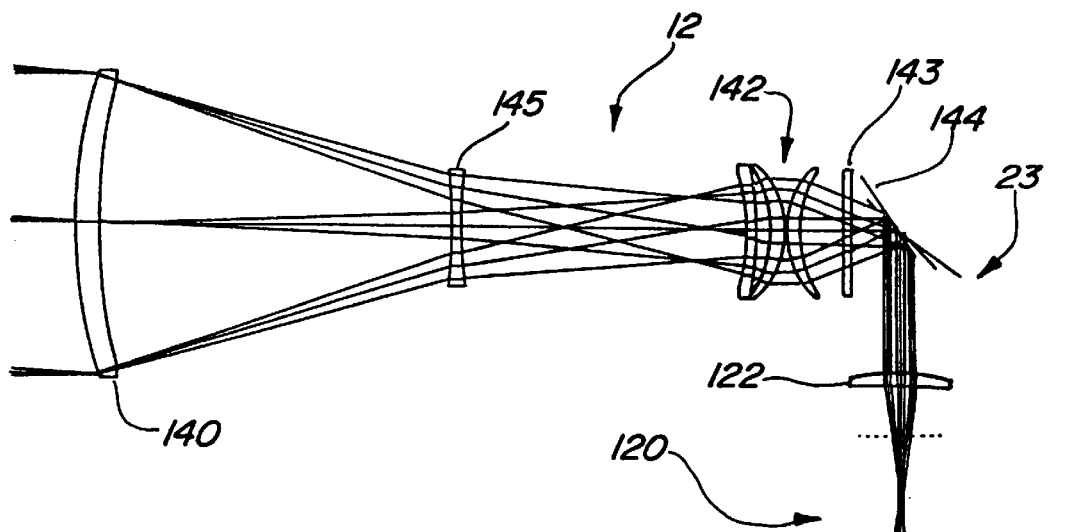
FIGS. 10A and 10B are top plan views of the imager of the present invention implemented in a thermal imaging system in both narrow and wide fields of view.
Figure 10B:
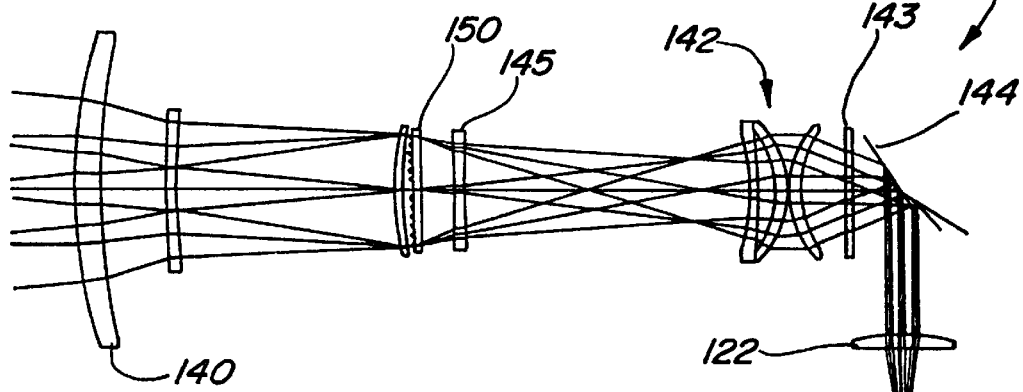
Figure 11:
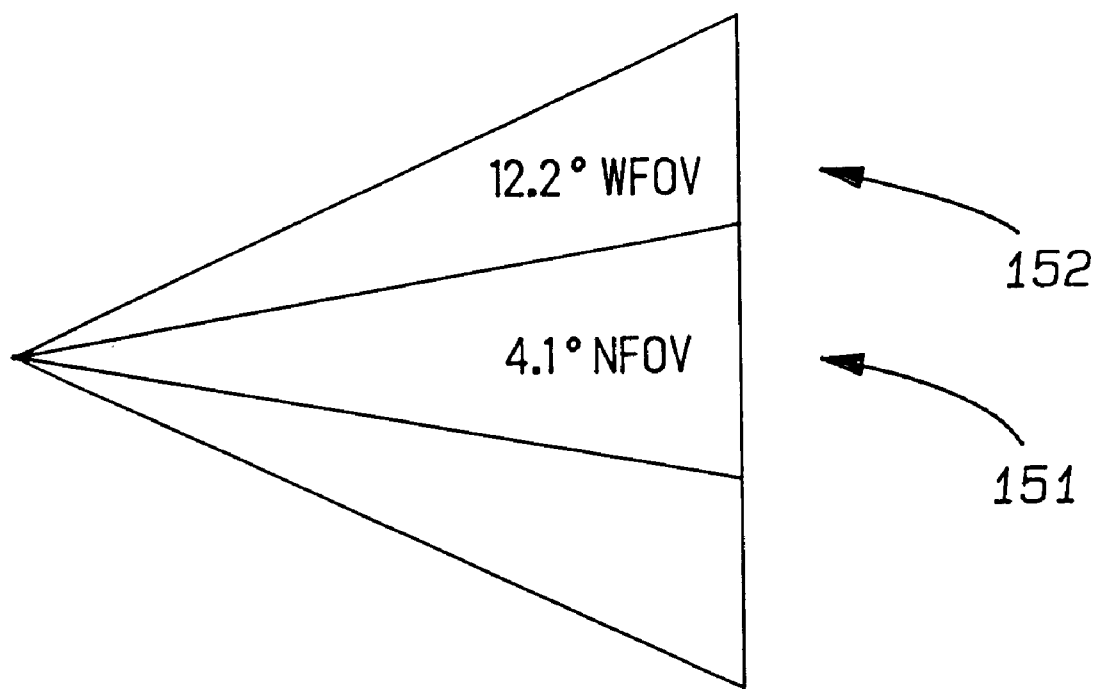
FIG. 11 illustrates situational awareness of the thermal imaging system in both narrow and wide fields of view.

Turning now to FIGS. 10 and 11, the imager lens assembly 120 according to a preferred embodiment of the present invention is shown implemented along with the telescope assembly 16 and the scanner 23 of the thermal imaging system 12 described above. In FIG. 10A, the telescope assembly is switched into a narrow field of view mode of operation. A telescope assembly stop 140 allows only energy within a certain spectral band, preferably 7.5 to 10.5 microns, to pass. The telescope lens assembly shown generally at 142 preferably has a 3.5 inch diameter aperture and focuses the detected target scene energy onto the multi-faceted scanner 23 subsequent to the energy passing through the scanner sealing window 143 forming the imager entrance pupil 144. The imager entrance pupil 144 also functions as a telescope exit pupil. A compensator 145 compensates for telescope lens assembly focal length fluctuation. The scanner sealing window 144 is positioned, preferably at an angle of about 16° with respect to the incident scene energy, to eliminate system narcissus effects caused by surface reflections from the telescope lenses. As the detected scene energy is focused onto one of the scanner facets 23a–23h, the scan wheel subsequently rotates and reflects the energy through the imager lens assembly 120 and onto the detector array 26 as described above. The resulting output video signal creates an image on the displays 19, 21 with a field of view having a narrow azimuth width, as indicated generally at 151 in FIG. 11.

Referring to FIG. 10B, the lens assembly 120 is shown implemented along with the telescope assembly 12, with the telescope assembly 12 being switched into a wide field of view mode. In this wide field of view mode, a warm stop 150 is switched into the detected scene energy path to allow more energy from the scene 14 to pass through the telescope assembly and thus subsequently through to the detector array. The imager lens assembly functions in a manner identical to that described above in conjunction with FIG. 8A. As shown generally at 152 in FIG. 11, the telescope assembly, when operating in a wide field of view mode, creates a field of view having a wide azimuth width significantly wider than that in the narrow field of view mode.

The preferred optical characteristics of the imager lens assemblies 120, 130 are listed below in Table II. The optical characteristics of the overall system, including the telescopic assembly, for both narrow field of view and wide field of view operation are listed below in Table III. t,170 t,180

It should be appreciated at this point that the imager assemblies 120, 130, while lacking negative power elements of the original spherical lens-implemented system, each have a slight amount of associated field curvature and chromatic-aberration. However, these characteristics are offset by the fact that the imager of he present invention is utilized over only shorter wavelengths of the original spectral band and thus has a higher diffraction limited (MTF).

It also should be appreciated at this point that the aspherical imager lens assembly of the present invention minimizes the number of components required for implementation of the imager assembly when compared to prior art spherical imager lens assemblies. While a conventional lens assembly having several lenses exhibits little or no distortion, the imager lens assembly of the present invention has an associated distortion of less than 2% for both narrow and wide fields of view. The imager lens assembly of the present invention is implemented over a smaller spectral bandwidth, thereby eliminating the need for additional lenses required for color correction in imager lens assemblies implemented over a broader spectral bandwidth. In particular, the imager lens assembly of the present invention eliminates the need for lenses manufactured from AmTir1, which is a brittle material that is highly susceptible to breakage. By minimizing the number of components required to implement the imager lens assembly of the present invention, overall system cost and complexity is reduced, while a high degree of overall system performance is maintained.

Various other advantages of the present invention will become apparent to those skilled in the art after having the benefit of studying the foregoing text and drawings, taken in conjunction with the following claims.

What is claimed is:

1. In a thermal imaging unit including optics for detecting a target scene, a detector array responsive to target scene energy and a scanner for scanning the target scene energy onto said detector array, an imager for focusing the scanned target scene energy onto said detector array, comprising:

entrance means for passing long-wave infrared target scene energy;

a first aspherical lens for providing an intermediate focus of the long-wave infrared target scene energy passed through said entrance means; and a second aspherical lens for receiving the intermediately focused long-wave infrared target scene energy and for providing an end focus of the intermediately focused long-wave infrared target scene energy.

2. The imager of claim 1, further comprising first and second folding mirrors positioned to reflect the target scene energy between said first and second aspherical lenses.

3. The imager of claim 1, wherein said first and second lenses are linearly aligned.

4. The imager of claim 3, wherein said first and second lenses are separated by a distance of about 3.617 inches.

5. The imager of claim 1, wherein said spectral band of said first and second lenses is between 7.5 and 10.5 microns.

6. The imager of claim 1, where in said lenses are comprised of single point diamond turned germanium.

7. The imager of claim 1, further comprising a field stop positioned at said intermediate focus of the target scene energy for minimizing narcissus effects on the target scene energy.

8. The imager of claim 1, further comprising a scanner sealing window positioned to eliminate narcissus effects on the target scene energy.

9. The imager of claim 8, wherein said sealing window is tilted at approximately 16° to eliminate said narcissus effects on the target scene energy.

10. The imager of claim 1, wherein said first and second lenses each include front and rear surfaces coated with anti-reflection coatings.

11. The imager of claim 1, wherein said imager has an effective focal length of about 0.675 inches.

12. The imager of claim 1, wherein said entrance means comprises a pupil formed at a scanner sealing window.

13. A thermal imaging system, comprising:
 optics for detecting a target scene;
 a display for displaying an image of said detected target scene;
 a detector array having elements each being electrically responsive to energy from said detected target scene, said elements generating signals used to output a video signal of said target scene image to said display;
 a scanner for scanning said detected target scene energy onto said detector array;
 a two-lens imager for focusing longwave infrared target scene energy onto said detector array, comprising:
  a first aspherical lens for providing an intermediate focus of said long wave infrared target scene energy; and
  a second aspherical lens for focusing said intermediately focused long wave infrared target scene energy onto said detector array.

14. The thermal imaging system of claim 13, wherein said imager has an associated image distortion of less than 2%.

15. The thermal imaging system of claim 13, wherein said optics forms a 3.5 inch diameter aperture.

16. The thermal imaging system of claim 13, wherein said optics further comprises a warm stop selectively switched into and out of said optics to switch said optics between narrow and wide fields of view.

17. The thermal imaging system of claim 13, wherein said detector array is housed within a dewar, said dewar including a cold stop for passing energy only from said detected target scene to said detector array.

18. A thermal imaging system, comprising:
 optics for detecting a target scene;
 a display for displaying an image of said detected target scene;
 a detector array having elements each being electrically responsive to long-wave infrared energy from said detected target scene, said elements generating signals used to output a video signal of said target scene image to said display;
 a scanner for scanning said detected target scene long-wave infrared energy onto said detector array;
 an imager for focusing said detected target scene long-wave infrared energy onto said detector array, comprising:
  a first aspherical lens for providing an intermediate focus of said detected target scene long-wave infrared energy; and
  a second aspherical lens for focusing said intermediately focused detected target scene long-wave infrared energy onto said detector array.

19. A two-lens imaging system for focusing long-wave infrared energy onto a long-wave infrared energy detector, comprising:
 a system input that inputs detected long-wave infrared energy;
 a first aspherical lens for providing an intermediate focus of the detected long-wave infrared energy passed through the energy input; and
 provide a second aspherical lens for receiving the intermediately focused long-wave infrared energy to provide an end-focus of the intermediately focused long-wave infrared energy onto the energy detector.

* * * * *